March 19, 1935.  T. H. MILLER  1,994,957
DEVICE FOR ADVANCING A BOARD TO CUT-OFF SAWS
Filed July 25, 1933
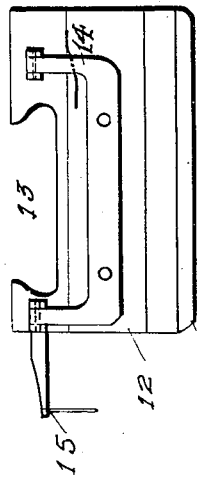
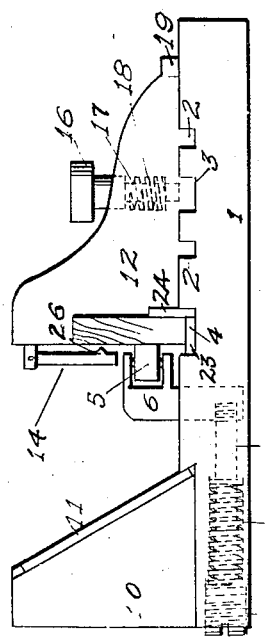
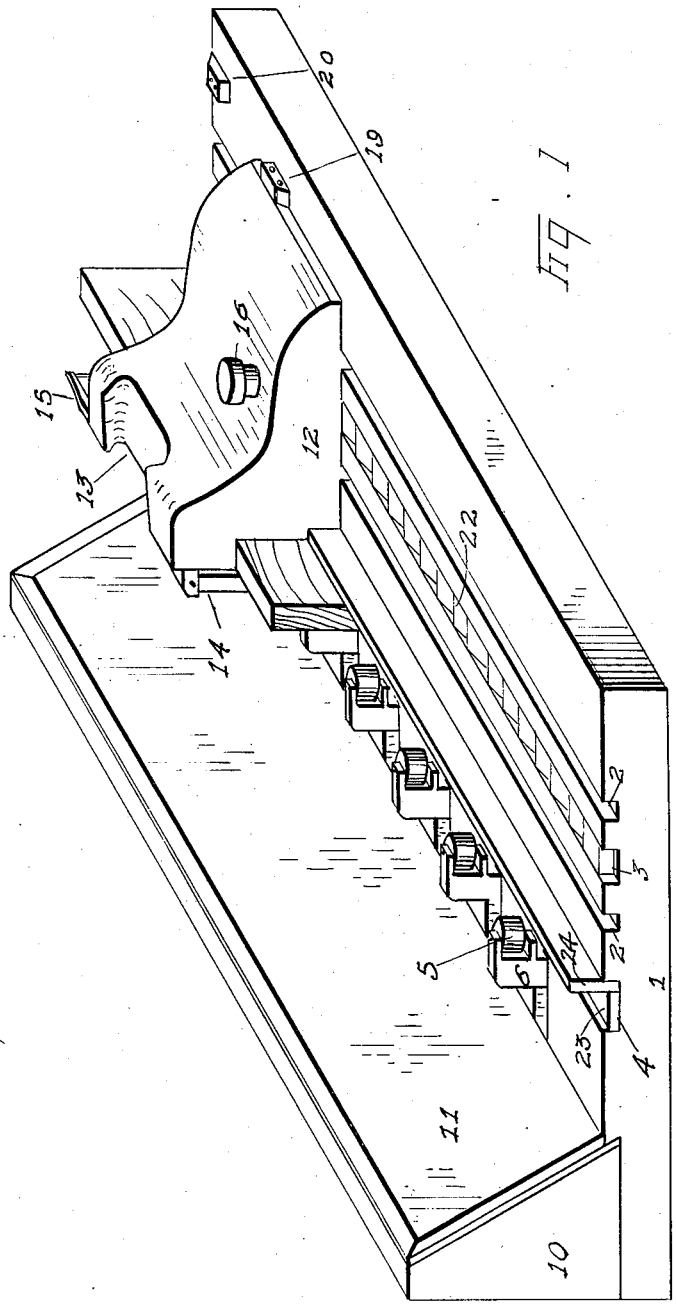
Theodore H. Miller, INVENTOR Patented Mar. 19, 1935

1,994,957

UNITED STATES PATENT OFFICE 1,994,957

DEVICE FOR ADVANCING A BOARD TO CUT-OFF SAWS

Theodore H. Miller, Walla Walla, Wash.

Application July 25, 1933, Serial No. 682,049

5 Claims. (Cl. 144—253)

My invention relates to improvements in the method of feeding stock to cut-off saws and seeks to provide means by which the component cuttings may be quickly obtained from lumber strips of indiscriminate grade. It further seeks to insure squarely sawn ends on said cuttings by shortening the necessary travel of the saw while expediting the cut to the point of eliminating the operator's tendency to crowd the same. It also seeks to insure cuttings of accurately gauged length without interrupting the flow of stock to the saw.

These objects are preferably attained by an advancing device, designed to handle the stock on edge, in conjunction with a horizontally travelling trim saw of the pedal operated type (not shown). The advancing device is illustrated in the accompanying drawing, in which:

Figure 1 is an isometric view of the complete advancing device; Figure 2 is a cross section of the complete advancing device; and Figure 3 is a front elevation of the slidable hand clamp.

Similar numerals refer to like parts thruout the several views.

My device is intended for use with conventional cut off saws of the horizontally travelling type and the saw for the purposes of this specification is assumed to be set close to the further end of the device operated at a 90 degree angle to the advance of the board so as to strike the broad side of the same. The saw will be preferably operated by a foot pedal convenient to the operator.

The bed plate 1 as shown in Figure 1 is formed so as to provide channels 2, for the reception of the travel guides 21 affixed to the base of the slidable clamp 12, a groove 3 in which is seated the notched gauge bar 22, a groove 4 to admit the stock guides 23 and 24, a groove to admit the mirror mount 10, and a number of transverse bores terminating in open grooves to admit the pressure roll assemblage 6.

Positioned upon the bed plate 1 as shown in Figure 1 is the reciprocating hand clamp 12, formed to fit the hand and of such dimensions as to be easily operated yet firm in its support of the stock. It travels the length of the bed plate positioned by the travel guides 21 operating in the channels 2, its travel towards the saw being limited by the stop 19, attached to the sliding hand clamp, meeting the stop 20, attached to the bed plate. Its inner face is cut away to allow clearance for the stock guide 24 and so as to fit flush against the outer face of the stock. It overhangs the stock as shown in Figure 2 sufficient to hold the stock against the bottom stock guide 23. Extending beyond the overhang is a hinged dog clamp 14 as shown in Figure 2 and Figure 3, serving when set in combination with the pressure rolls 6 to hold the stock firmly against the slidable hand clamp. Small work dogs 26 prevent any movement of the board beyond that of the slidable hand clamp. Extending ahead of the slidable hand clamp 12 and on line with the dog clamp 14 is an indicator arm 10 and indicator 15 as shown in Figure 3, approaching the saw as near as possible when the slidable hand clamp is fully advanced and set so as to reflect to the operator the approximate line of the saw travel against the face of the stock. Penetrating the outer face of the sliding hand clamp is a recoil pin 16, engaging the notched gauge bar 22 when depressed.

At the rear of the bed plate 1 is positioned the mirror mount 10 supporting the mirror 11, as best shown in Figure 1, which reflects to the operator the inner or grade face of the stock and the position of any defects in relation to the indicator 15 carried by the slidable hand clamp as the clamp is retarded.

The ball bearing pressure rolls 6 serve to hold the stock firmly against the stock guide 24 the hangers being actuated by the adjustment screw 9 operating in conjunction with the expansion spring 8 against the flanged rod 7 terminating in the hanger of each, as shown in Figure 2.

The notched gauge bar 22, accurately notched for the desired combination of measurements, is tightly fitted to the groove 3 and when set, will, accurately in combination with the recoil pin 16, limit the retarding movement of the indicator. Let it here be understood that the bar must be set to allow for the space of one saw kerf in addition to each measurement.

In operation the stock is drawn along the stock guides by means of the slidable hand clamp 12 with the hinged dog clamp 14 set, the dogs 26 restricting the movement of the stock relative to the travel of the hand clamp. With the first cut made to trim the end of the stock, the hinged dog clamp is released by means of a hand strap, and the slidable hand clamp retarded, the board being held stationary by the pressure rolls 6 in combination with the stock guide 24 until the indicator 15 as reflected in the mirror approaches a defect on the face of the stock as reflected in the mirror, when the recoil pin 16 is depressed to engage the nearest notch on the gauge bar 22. The hinged dog clamp 14 is then set and the sliding hand clamp advanced carrying with it the board until the stop 19 strikes the stop 20, and the cut is made. If sufficient tension be applied to certain of the pressure rolls 6 the stock will not move while the hand clamp is being retarded. The defect mentioned will on the next stroke be eliminated by a slight retarding and advancing movement sufficient to cover the defect, which will be trimmed off, leaving another clear cut exposed.

It should be noted that clear cuttings and cuttings of indiscriminate grade may in like manner be segregated and should rolls be placed under the bed plate 1 to permit its transverse movement they could be fed to the saw so as to emerge from the saw onto two parallel conveyors. Conventional conveyors may be used to remove the cuttings from beyond the saw allowing the short waste cuts to drop.

It is now evident that with the saw set level at a 90 degree angle to the movement of the stock, with the stock guide 23 horizontal, and the stock firmly supported that all cuts must to practical purposes be square. It is further evident that with the reduced arc thru which the saw must swing the operator has little tendency to crowd the cut. It is further evident that with the indicator the operator can approximate the length of the cut to be taken and can accurately gauge the same without interrupting the flow of stock to the saw materially or concerning himself with the pieces trimmed off as is the case when conventional stops on the opposite side of the saw are used.

Having thus described my invention I claim:

1. In a device for advancing a board on edge to a cut off saw for successive trims of varied length the combination of a saw plane indicator attached to a slidable hand clamp forming a lateral abutment at one face side of the board and a mirror so positioned that the position of the indicator is reflected with the outermost side of the board in the background.

2. In a device for advancing stock to a cut off saw, a side guide to guide the stock, pressure rolls to hold the stock against the side guide on edge, a hand clamp slidable within the guide and forming a lateral abutment for one side face of the stock, a portion of the clamp overhanging the stock, an indicator mounted on said clamp adjacent the saw when the clamp is fully advanced, and a mirror positioned to reflect one side face of the stock and also the indicator against same as the clamp is moved away from the saw.

3. In a device for advancing a board to a cut-off saw having in combination an indicator, a reflector in which said indicator is visible, a slidable hand clamp attached to the indicator, said indicator being adjacent the saw when the support is fully advanced and adjacent one surface of the board throughout the movement of the clamp.

4. In a device for advancing a board to a cut-off saw, the combination of a board-supporting hand clamp movable parallel with the board, an indicator mounted thereon adjacent the saw when the support is fully advanced and adjacent one face side of the board at all times, a reflector in which said indicator is visible to the operator, a normally retracted pin capable of being moved below the bottom of said clamp, and a series of stops so positioned along the path of said clamp as to be in line with the pin.

5. In a device for advancing work to a cut-off saw, a side guide to guide the work, pressure rolls to hold the work on edge against the guide, a mirror to reflect one side face of the work as it is advanced along the guide, a support adjustable along the guide and forming a lateral abutment for the other side face of the work, a portion of the support overhanging the work, and an indicator mounted thereon to indicate a desired saw line in the mirror.

THEODORE H. MILLER.